United States Patent [19]

Do

[11] Patent Number: 4,935,151
[45] Date of Patent: Jun. 19, 1990

[54] PROCESS AND APPARATUS FOR DEGASSING AND FILTERING LIQUIDS

[75] Inventor: Dac-Vong Do, Langen, Fed. Rep. of Germany

[73] Assignee: E. I. Du Pont de Nemours and Company, Wilmington, Del.

[21] Appl. No.: 274,434

[22] Filed: Nov. 22, 1988

[30] Foreign Application Priority Data

Dec. 29, 1987 [DE] Fed. Rep. of Germany ....... 3744422

[51] Int. Cl.⁵ .................... B01D 29/38; B01D 19/00
[52] U.S. Cl. ...................... 210/739; 210/88; 210/98; 210/108; 210/142; 210/188; 210/333.1; 210/340; 210/791; 55/55
[58] Field of Search ............. 210/98, 108, 142, 143, 210/188, 194, 195.1, 333.01, 333.1, 341, 386, 391, 411, 413, 414, 415, 416.1, 750, 790, 791, 80.5, 88, 340; 55/55, 189

[56] References Cited

U.S. PATENT DOCUMENTS

| | | | |
|---|---|---|---|
| 1,577,839 | 3/1926 | Moone | 210/386 |
| 2,094,863 | 10/1937 | Young | 210/386 |
| 3,275,151 | 9/1966 | Carr | 210/333.1 |
| 3,635,348 | 1/1972 | Carr | 210/333 |
| 3,734,299 | 5/1973 | Akiyama | 210/333.1 |
| 3,784,016 | 1/1974 | Akiyama | 210/333.1 |
| 3,926,664 | 12/1975 | Verreydt | 55/55 |
| 4,298,357 | 11/1981 | Pernic | 210/188 |
| 4,341,642 | 7/1982 | Koepke et al. | 210/767 |
| 4,428,757 | 1/1984 | Hall | 210/188 |
| 4,482,461 | 11/1984 | Hindman et al. | 210/143 |
| 4,673,498 | 6/1987 | Swinney et al. | 210/333.1 |
| 4,675,116 | 6/1987 | Hayland | 210/709 |
| 4,781,825 | 11/1988 | Grimes et al. | 210/333.1 |
| 4,818,420 | 4/1989 | Mims | 210/108 |

FOREIGN PATENT DOCUMENTS

| | | | |
|---|---|---|---|
| 0046919 | 10/1982 | European Pat. Off. | 210/188 |
| 2502669 | 1/1977 | Fed. Rep. of Germany | 210/411 |
| 2601732 | 7/1977 | Fed. Rep. of Germany | 210/411 |
| 2737135 | 3/1979 | Fed. Rep. of Germany | 210/413 |
| 1441575 | 7/1976 | United Kingdom | 55/55 |
| 1559639 | 1/1980 | United Kingdom . | |

Primary Examiner—Frank Spear
Assistant Examiner—Joseph Drodge

[57] ABSTRACT

In a process for degassing and filtering liquids, particularly coating emulsions, a feed stream (F) is subdivided into a process stream (N), which is fed continuously to a process use through a main filter (16), and a recycled fractional stream. The fractional stream (T) is used to backflush successive sections of the main filter (16) and in turn is filtered through a supplementary filter (21, 22). In the apparatus for the process, a backflushing device (17) is associated with the main filter (16), the fractional stream (T) is used as a flushing means and the filter surface of the main filter (16) is cleaned progressively. Thus, a liquid with a continually constant grain size distribution, without gas bubbles and particles that cause defects, can be delivered continuously to the specific use.

18 Claims, 2 Drawing Sheets

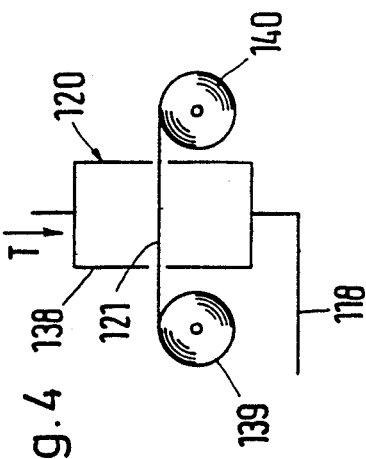
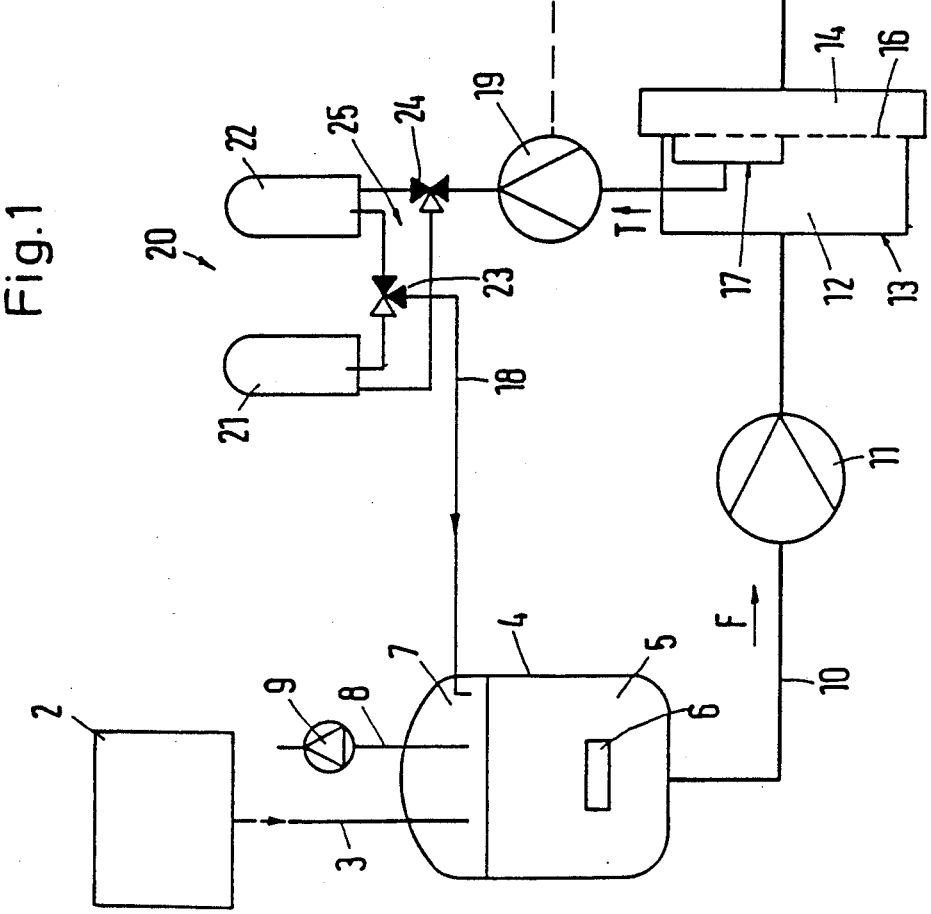

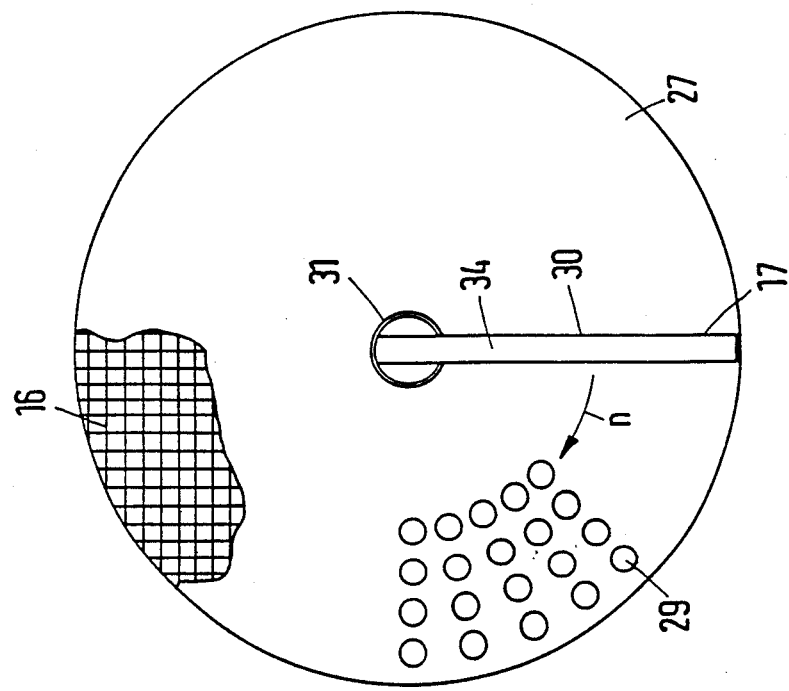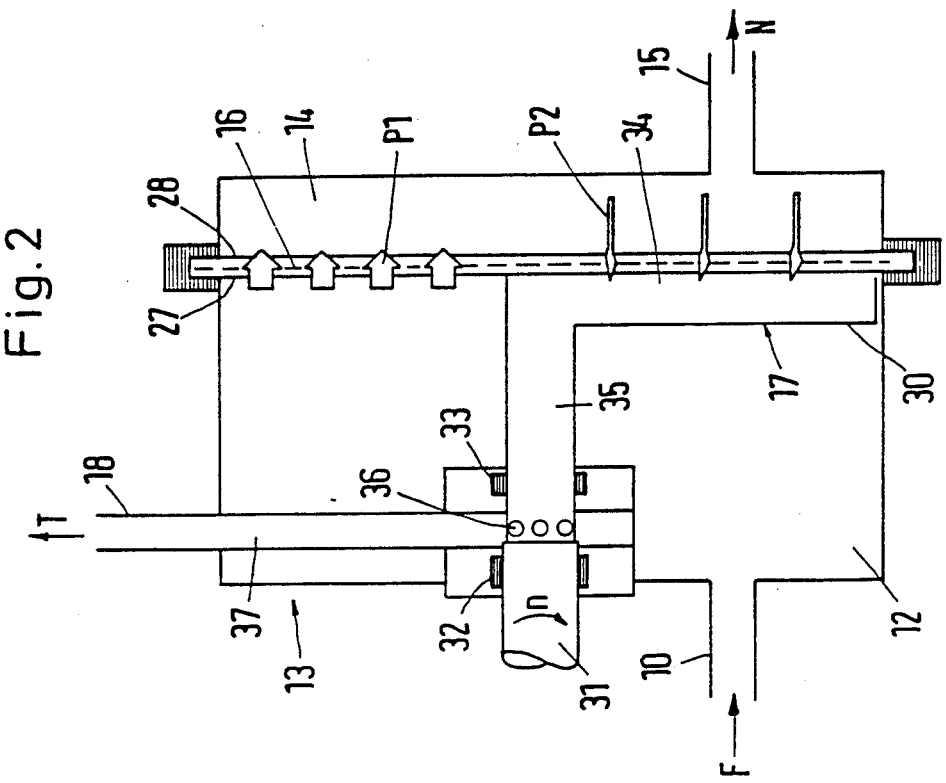

PROCESS AND APPARATUS FOR DEGASSING AND FILTERING LIQUIDS

BACKGROUND OF THE INVENTION

1. Field of the Invention

This invention relates to a process for degassing and filtering liquids and an apparatus for performing the process. In the process, a feed stream of liquid is divided into a process stream that is continuously passed through a main filter to a specific use and a fractional stream that is removed from an area of the main filter and cycled for reuse.

2. Description of the Related Art

Degassing and filtration are particularly suited for the preparation of emulsions, solutions and dispersions used for coating, particularly coating, in the production of photographic film, electronic data media and similar products. Each gas bubble and each foreign particle cause flaws in the final product.

A process and apparatus for degassing and filtration are known from European Patent No. 0,046,919. A cartridge filter, that is, a type of depth filter, serves as the main filter. Its filter element retains foreign particles. Air or gas bubbles collect on the surface of the filter element, coalesce and rise to the upper part of the filter chamber. A backflow line is connected there to forward the fractional stream containing bubbles to a degassing system from which the material can be recycled to production As such filter cartridges have a limited service life, because the filter surface and its pores become gradually clogged by bubbles and particles, a switching device is provided by which a second cartridge filter takes over the function of the first filter cartridge and the latter can be replaced.

Thus, degassing and filtration can be continuous. However, filter behavior changes as a result of retained bubbles and particles. The liquid recycled for use does not always have a constant particle size distribution. This is a disadvantage in many processes, for example, in the production of photographic film.

Continuous cleaning of a filter by backflusing is also known. See U.S. Pat. No. 3,635,348. For this purpose, a rotor is provided on the inlet surface of the filter. The rotor has a radial slot on the inlet surface of the filter and a hollow interior connected to an outlet line. This type of filter is used mainly for handling waste water and other contaminated water, that is, liquids with low viscosity and relatively large contaminating particles.

It is an object of the present invention to provide a process for continuously degassing and filtering a liquid, which process assures not only effective removal of bubbles and solid particles, but also a continuously constant particle size distribution in the liquid delivered to a specific use.

SUMMARY OF THE INVENTION

The above objective is achieved in the invention by the fractional stream being used to backflush successive sections of the main filter and in turn being filtered.

The invention comprises a process for degassing and filtering a liquid, particularly a coating solution, in which a feed stream of the liquid is subdivided into a process stream, which is fed continuously through a main filter to a specific use, and a fractional stream, which is withdrawn from an area of the main filter and recycled for reuse, characterized in that the fractional stream is used to backflush successive sections of the main filter and is itself filtered.

As a result of backflushing, the filtration properties of the main filter are constant. These can be selected so that the process stream is completely bubble-free and contains no solid particles above a sharply defined separation limit. The fractional stream contaminated by backflushing is filtered in a supplementary filter. Here, variations in filtration properties are harmless, because liquid from the backflush stream is supplied for a specific use only after additional filtration through the main filter. Therefore, the supplementary filter can have a longer service life. Its replacement is not difficult.

The fractional stream can be any proportion of the feed stream, for example 5 to 50%. As the backflushing fractional stream has already been filtered through the main filter, the fractional stream can be regulated to be as large as is necessary to clean the main filter.

It is useful to degas the fractional stream after filtration. Thus, for recycle use, foreign particles and gas bubbles are completely or substantially removed.

It is recommended also that the feed stream be at least partially degassed before it is forwarded to the main filter. By this means, clogging of the main filter by gas bubbles is held to a low level.

It is desirable that the size of the fractional stream can be controlled or regulated as a function of the requirement of the specific use. This can be accomplished by simple means such that a constant stream volume per time unit is supplied for a specific use.

An apparatus for performing the process with a main filter unit to which is attached an inlet line for the feed stream, a process line for the process stream and a return line for the fractional stream is characterized in that the main filter unit has a backflushing device that uses the fractional stream as a flushing means to clean progressively a filter surface, and in that a supplementary filter is installed in the return line.

The main filter is preferably a surface filter. Such surface filters consist generally of a fabric, for example of steel wires or synthetic fibers. The mesh width is essentially responsible for the filter action. There are clear and constant, sharply defined separation limits for solids filtration. Surface filters do have a short service life. However, this is mitigated by backflushing.

It is particularly advantageous for the surface filter to have a mesh interstitial width of 5 to 50 micrometers ($\mu$m). At these mesh widths, not only are the larger solid particles retained, but surprisingly, bubbles smaller than the mesh width are also retained. Extraordinarily good filtration results, even with respect to small bubbles. It is possible for the first time to separate gas bubbles that are smaller than the desired solid particles present in coating solutions or dispersions. The mesh width is of an order of magnitude such that small pressure differences suffice to impel through the filter the feed stream as well as the backflushing stream that is required for complete regeneration.

It is desirable that the surface filter have a fabric fixed between two perforated plates. The plates give fine fabric adequate rigidity.

In a preferred embodiment, the inlet side of the filter is from above and/or the side. This assures that the direction of bubble flow does not coincide with the direction of stream flow through the filter. Thus, small bubbles can be held in contact with the filter fabric until they are swept by the backflushing fractional stream into the return line.

A recommended construction is for the backflushing device to have a rotor with a radial slot on the inlet side of the main filter and a hollow interior connected to the return line. The radial slot is small compared to the filter surface. Consequently, a relatively high flow speed results for backflushing; this is also so if the fractional stream constitutes a small proportion of the feed stream. This leads to very intensive cleaning of the main filter.

It is desirable to have a feed pump in the inlet line and a supplementary pump in the return line. As the process is often operated at ambient pressure, the supplementary pump assures that an adequate pressure difference is available for backflushing. Furthermore, the supplementary pump can be adjustable with respect to the feed volume. As the fractional stream volume is not critical, the process stream can be controlled in this fashion.

In particular, a flowmeter can be located in the process line to regulate the supplementary pump.

The supplementary filter should be preferably a depth filter. The depth filter can retain a relatively large number of solid particles. That the filtration properties of the depth filter change with increasing load is not disadvantageous, because the purified fractional stream is reused only after passing again through the main filter.

The depth filter can have at least two filter cartridges which can be switched alternatively into the return line by switching apparatus. Switching can take place at rather long time intervals. By exchange of the contaminated cartridge the particles are removed from the system.

Another possibility for the depth filter is that of a continuously moving filter web, such as paper, nonwoven fabric or the like.

Furthermore, the return line should be connected to a degassing vessel. Thus, incomplete degassing by the depth filter is unimportant.

A particularly simplified construction is to have a degassing vessel coupled to the feed line and have the return line empty into this degassing vessel. Thus, an already available degassing vessel can be used for the fractional stream.

To achieve especially intensive degassing, it is recommended that the degassing vessel be maintained at a vacuum. Another possibility, which can be used simultaneously, consists of employing an ultrasonic generator.

BRIEF DESCRIPTION OF THE DRAWINGS

The invention is explained in more detail below, with the aid of a preferred embodiment illustrated in the drawings, in which:

FIG. 1 is a flow diagram of a degassing and filtration apparatus of the present invention.

FIG. 2 is a cross section through the main filter with a backflushing device of the present invention.

FIG. 3 is a top view of a main filter of the present invention.

FIG. 4 is a form of a supplementary filter of the present invention.

DESCRIPTION OF THE PREFERRED EMBODIMENT(S)

According to FIG. 1, a specific use 1, for example, a coating operation for the production of photographic film, is served from a supply vessel 2 with a liquid, for example, a coating emulsion.

On demand, the liquid passes through a connecting line 3 to a degassing vessel 4, in the liquid chamber 5 in which are located one or more ultrasonic generators 6. The gas bubbles rise into a gas chamber 7. The gas can be vented to the exterior through a line 8. It is expedient to locate in this line a suction pump 9 to produce a vacuum or decreased pressure in the inner chamber 7.

A conduit 10, with an inline feed pump 11, leads from the degassing vessel 4 to an inlet chamber 12 of a main filter unit 13. Its outlet chamber 14 is connected by a process line 15 with the specific use 1. Between chambers 12 and 14 is located a main filter 16 in the shape of a surface filter, which retains solid particles and gas bubbles, so that liquid with the desired purity reaches the specific use 1. Generally speaking, a surface filter is a device where particles are collected or build up at the surface of the filter element.

The main filter unit 13 has a backflushing device 17, which is connected to the degassing vessel 4 through a return line 18. In the return line 18 are located a supplementary pump 19 and a supplementary filter apparatus 20, which contains two supplementary filters 21 and 22 shaped like depth filters, such as cartridge filters. Generally, particles are collected in internal pores of the filter element in depth filtration. By means of a switching device 25 containing two three-way valves 23 and 24, one or the other supplementary filter can be switched into the return line as desired.

The feed pump 11 is driven at constant speed and therefore delivers a practically constant feed volume. The supplementary pump 19 can be regulated as a function of feed volume. It is controlled by coordination with a flowmeter 26, which measures the flow volume in line 15 to the specific use.

When the feed pump 11 is operating, a feed stream F is forwarded through the inlet line 10. This feed stream F is subdivided in the main filter 16 into a process use stream N, which flows through the process use line 15, and a fractional stream T, which flows through the return line 18. Variations in the feed stream F can be equalized by controlling the fractional stream T so that the process stream N is constant.

The main filter unit or apparatus 13 is illustrated in detail in FIGS. 2 and 3. The main filter 16 is formed of a woven structure that consists of steel wires or synthetic fibers with a mesh interstitial width between 5 micrometers ($\mu$m) and 50 $\mu$m. A perforated plate 27 forms the inlet side and a perforated plate 28, the outlet side of the surface filter 16 The fluid flowing through the main filter toward the specific use 1 is represented by the arrow P1.

The backflushing device 17 has a rotor 30 that is attached to a powered revolving axle 31. This is supported by bearings 32 and 33. The axle 31 revolves in the direction of the arrow n. The rotor 30 with a radial slot 34 fits against the inlet side of the main filter 16. The supplementary pump 19 draws liquid from the outlet chamber 14 in the direction of the arrow P2 through the radial slot 34 into the hollow interior 35 of the rotating axle 31 and from there, through radial openings 36 into a radial canal 37 connected with the return line 18. This liquid forms the fractional stream that serves to clean the main filter 16 continuously by backflushing.

The fractional stream T picks up the solid particles and gas bubbles entrapped on the inlet side of the main filter 16. These solid particles, as well as a portion of the gas bubbles, are separated in the supplementary filter apparatus 20 onto supplementary filter 21 and 22. The fractional stream, thus purified, reaches the degassing vessel 4, where the remainder of the gas bubbles is removed by ultrasonic and vacuum treatment. The resulting purified liquid can be used again in the feed stream. If the one supplementary filter 21 is clogged, the switching apparatus 25 is activated and the other supplementary filter 22 is put into operation. Then the first-cited supplementary filter 21 can be replaced or cleaned.

FIG. 4 illustrates a form of the supplementary filter apparatus 120, in which the corresponding part numbers are increased by 100. A non-woven web 121 is used as the supplementary filter, which is passed through gasketed openings in the wall of the filter housing 138. The web is drawn slowly from a feed roll 139 to a windup roll 140.

The invention is further illustrated by the following Examples.

EXAMPLE 1

A light sensitive emulsion contained 9.6% by weight silver bromide crystals with an average grain size of 0.6 $\mu$m, 8% by weight gelatin and other binders. This photoemulsion was coated onto a 10 centimeters (cm) wide polyester base. The wet coating weight was 60 grams per meter squared (g/m$^2$) and the web speed 100 meters per minute (m/min).

If the solution was coated on the base without special preparation, the film contained more than 20 defects per running meter. Under microscopic examination, the defects were recognized as caused by bubbles. The size of the bubbles varied from immeasurably small (smaller than 5 $\mu$m) to over 100 $\mu$m.

If the solution was treated by means of the described apparatus, no defects could be detected in the coated film. A main filter with a mesh width of 25 $\mu$m was used. A commercial depth filter was used as the supplementary filter; according to the manufacturer's data, the porosity was 3 $\mu$m nominally and 20 $\mu$m absolute. The vacuum in the degassing chamber was about 700 millibars (mbar or mb) absolute.

EXAMPLE 2

Two layers were coated simultaneously on the same base. The lower layer corresponded to the solution cited in Example 1. The top layer consisted of a solution with 7% by weight gelatin and 0 26% by weight polymethyl methacrylate (pMMA) particles.

The layers were coated on the base without special preparation by use of the process and apparatus of the present invention. The resulting film showed defects that were due to pMMA particles larger than 30 $\mu$m.

The above solutions were treated with the apparatus of the present invention as described in Example 1, the film showed no defects and no particles larger than 25 $\mu$m.

Thus, all gas bubbles and all particles or agglomerates that affect the coating process adversely and cause defects in the film were removed. As a result of backflushing, the main filter can operate continuously with uniform filtering properties. The backflushing takes place without loss of the valuable materials to be filtered. In particular, use of a surface filter as the main filter 16 provides a sharply defined and constant separation limit for solid particles, with smaller gas bubbles also being entrapped. The result is effective filtering of bubbles and flexible, deformable particles, because there is not a high pressure difference between the inlet side and the outlet side of the main filter 16, which would otherwise be caused due to the buildup of a filter cake. As the separation of bubbles is very effective, intensive degassing can be used without the hazard that bubbles could be created by such intensive degassing and then could not be removed.

Those skilled in the art, having the benefit of the teachings of the present invention as hereinabove set forth, can effect numerous modifications thereto. These modifications are to be construed as being encompassed within the scope of the present invention as set forth in the appended claims.

What is claimed is:

1. A process for degassing and filtering a liquid in which a feed stream of the liquid is subdivided into a process stream, which is fed continuously through a main filter to a specific use, and a fractional stream, which is withdrawn from an area of the main filter and recycled for reuse, characterized in that the fractional stream is used to backflush successive sections of the main filter and is itself filtered before rejoining the feed stream and in that the feed stream is at least partially degassed in a degassing vessel before it enters the main filter.

2. The process in accordance with claim 1, characterized in that the fractional stream is degassed after filtration.

3. The process in accordance with claim 1, characterized in that the quantity of the fractional stream can be controlled or regulated as a function of the requirement of the specific use.

4. An apparatus for degassing and filtering a liquid comprising: a main filter unit; an inlet line for a feed stream connected to the main filter unit; a process line for a specific use stream; and a return line for a fractional stream which is withdrawn from an area of the main filter; characterized in that the main filter unit comprises a backflushing device, which uses the fractional stream as a flushing means and cleans progressively a filter surface of the main filter unit, and in that a supplementary filter is located in the return line and a degassing vessel is located in the inlet line.

5. The apparatus in accordance with claim 4, characterized in that the main filter unit includes a surface filter.

6. The apparatus in accordance with claim 5, characterized in that the surface filter comprises a mesh interstitial width of 5 to 50 um.

7. The apparatus in accordance with claim 5, characterized in that the surface filter comprises a fabric held between two plates, the two plates provided with perforations.

8. The apparatus in accordance with claim 4, characterized in that the inlet side of the main filter unit faces upwards and/or sideways.

9. The apparatus in accordance with claim 4, characterized in that the backflushing device comprises a rotor with a radial slot against an inlet side of the filter surface and the rotor is connected with the return line.

10. The apparatus in accordance with claim 4, characterized in that a feed pump is located in the inlet line and a supplementary pump is located in the return line.

11. The apparatus in accordance with claim 10, further comprising means for regulating the supplementary pump as a function of the feed quantity.

12. The apparatus in accordance with claim 10, characterized in that a flowmeter is located in the process line to the specific use and regulates the supplementary pump.

13. The apparatus in accordance with claim 4, characterized in that the supplementary filter is a depth filter.

14. The apparatus in accordance with claim 13, characterized in that the depth filter comprises at least two filter cartridges and wherein the apparatus further comprises means for switching the two filter cartridges alternately into the return line.

15. The apparatus in accordance with claim 13, characterized in that the depth filter comprises a continuously moving filter web.

16. The apparatus in accordance with claim 4, characterized in that the return line is connected to the degassing vessel.

17. The apparatus in accordance with claim 16, further comprising means for producing a vacuum in the degassing vessel.

18. The apparatus in accordance with claim 16, characterized in that the degassing vessel includes an ultrasonic generator.

* * * * *